Nov. 13, 1956 E. W. HAWKINS 2,770,056
BRUSH RAKE ATTACHMENT FOR A TRACTOR
Filed Aug. 9, 1955. 2 Sheets-Sheet 1
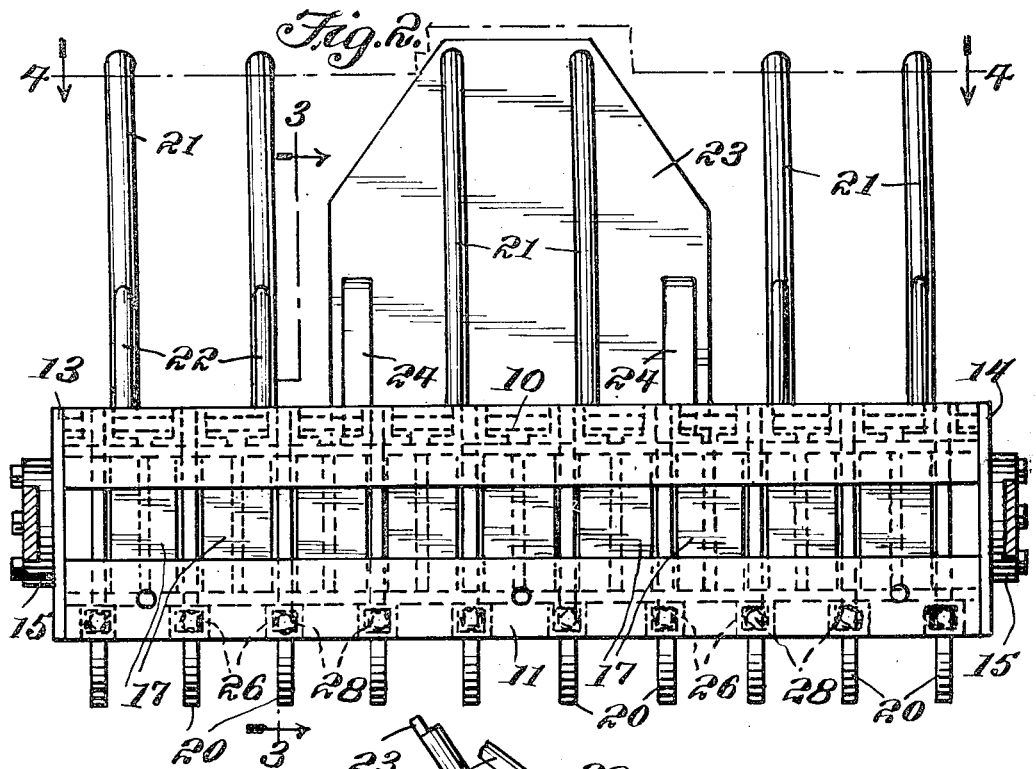
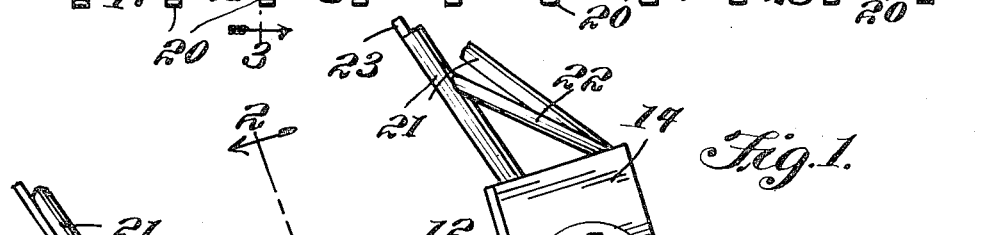
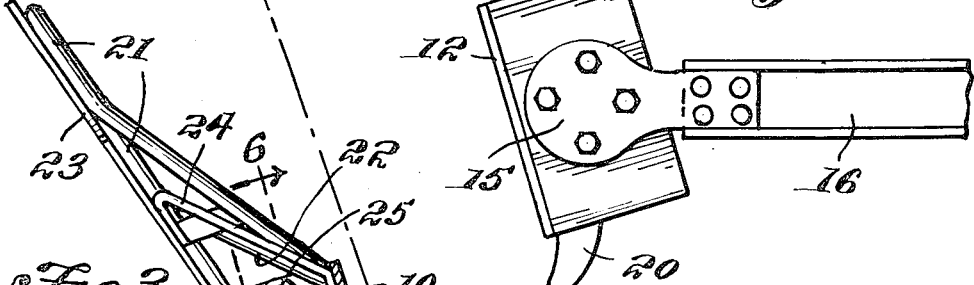
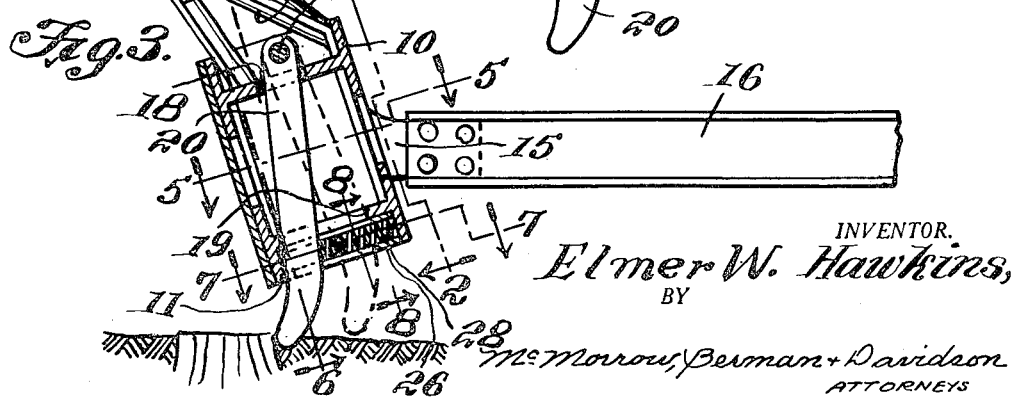
INVENTOR.
Elmer W. Hawkins,
BY
McMorrow, Berman + Davidson
ATTORNEYS

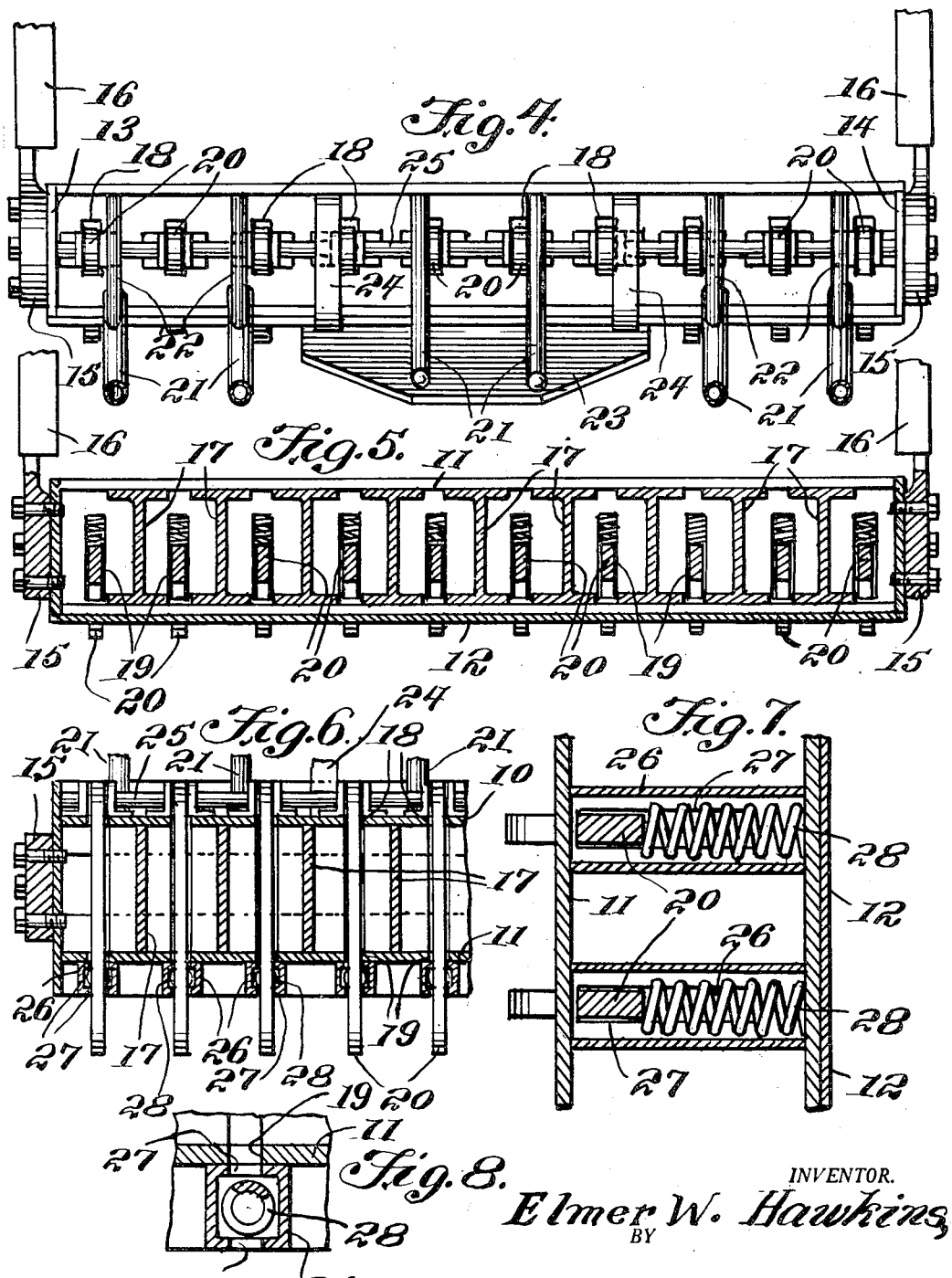

United States Patent Office 2,770,056
Patented Nov. 13, 1956

2,770,056

BRUSH RAKE ATTACHMENT FOR A TRACTOR

Elmer W. Hawkins, Jonesboro, Ark.

Application August 9, 1955, Serial No. 527,352

2 Claims. (Cl. 37—2)

The present invention relates to raking attachments for use on bulldozers and tractors for clearing of land of brush, roots, stumps, and the like.

The primary object of the present invention is to provide a brush rake attachment for a bulldozer or a tractor having outwardly depending teeth biased forwardly by heavy springs in order to be flexible when the teeth encounter roots, stumps, rocks, and the like, and which would normally impart damage to the teeth or the bulldozer blade when encountered.

Another object of the present invention is to provide a bulldozer blade with teeth which are sturdy and so mounted upon the blade that they are swingable from a forwardly position to a rearwardly position when they come into abutting engagement with a stump or root.

A further object of the present invention is to provide a raking attachment for a bulldozer blade which swings from a forwardly position to a rearwardly position somewhat out of the ground in order to clear rocks, roots, stumps, and the like, after once encountering the rock, stump, or other hard-to-move object.

A still further object of the present invention is to provide a brush rake attachment for a bulldozer or a tractor formed from a pair of I-beams which constitute the cross beams of the attachment and are reinforced by short sections of other I-beams, the flanges of which form slots through which the depending teeth swing from a forwardly position to a rearwardly position.

These and other objects of the present invention will be fully apparent from the following description, when taken in connection with the annexed drawings, in which:

Figure 1 is a side view and elevation showing the present invention connected to the elevating side arms of a bulldozer or tractor.

Figure 2 is a rear view looking forwardly on line 2—2 of Figure 3,

Figure 3 is a side view in cross-section in line 3—3 of Figure 2,

Figure 4 is a top view of line 4—4 of Figure 2,

Figure 5 is a top view in cross section of line 5—5 of Figure 3,

Figure 6 is a partial front view in cross-section of line 6—6 of Figure 3,

Figure 7 is a cross-sectional view on line 7—7 of Figure 3, greatly enlarged, and Figure 8 is a partial view in cross-section from the front on line 8—8 of Figure 3.

Referring in greater detail to the drawing in which like numerals indicate like parts throughout the several views, the brush rake attachment of the present invention is seen to consist of a pair of horizontally-disposed cross-beams 10 and 11, formed from an I-beam, as shown in cross-section end view in Figure 3.

The cross beams 10 and 11 are arranged in superimposed relation with respect to each other and are secured together by a front plate 12, with end plates 13 and 14 connecting the ends of the cross beams 10 and 11 together in forming a support for the plates 15 which are secured thereto and to elevating sidearms 16 of the tractor or bulldozer.

A plurality of vertically extending beams 17 are formed from short sections of I-beams and are positioned on their web ends and connected to each of the cross-beams 10 and 11. The beams 17 are spaced apart from each other and the cross-beams 10 and 11 are each formed with slots, the former with a relatively short slot 18 and the latter with a longer slot 19 through which the depending teeth 20 are swingably movable from the forwardly position as seen in Figure 3 in a full line to the rearwardly position shown in dotted lines in that figure.

A plurality of upstanding pipes or tubes 21 extend from the uppermost cross-beam 10 and are braced by the braces 22 into a forwardly-slung position in order to better pile and compress the brush raked together by the teeth 20.

A plate 23 is secured to the uppermost cross-beam 10 and is supported by the short braces 24 in the same plane as the pipes 21 and forms a guard for the front end of the tractor or bulldozer (not shown).

Each of the legs 20 is swingingly suspended from the pipe 25, as shown in Figures 4 and 6, and projects through its associated channel member 26, which is secured below and to the roller of the cross-beam 11.

The channel member 26 are spaced from each other in order to provide a slot 27 in which each of the teeth 20 is swingably movable and is biased forwardly by a spring 28, as shown in end view in Figure 8 and most clearly in side view in Figure 3.

An enlarged view of channel member 26 and the spring 28 is seen in Figure 7.

While a single embodiment of the present invention has been here illustrated and described, it is believed that other embodiments may be made and practiced within the scope of the appended claims without departing from the spirit of the invention.

What is claimed is:

1. A brush rake attachment comprising a pair of horizontally-disposed cross-beams arranged in superimposed spaced relation, a pair of end plates connecting said cross-beams together, a plurality of teeth dependingly carried by the upper one of said cross-beams between said end plates and in spaced relation with respect to each other, said teeth being connected to said upper one of said cross-beams for swinging movement transversely with respect to said pair of cross-beams between a forwardly position and a rearwardly position, said teeth projecting by their lower ends below the lower one of said cross-beams, and spring means connected to said teeth adjacent their lower ends for biasing said teeth toward the forwardly position.

2. A brush rake attachment comprising a pair of horizontally disposed cross-beams arranged in superimposed spaced relation, a pair of end plates connecting said cross-beams together, an upstanding front plate carried by said cross-beams and connected thereto, a plurality of teeth dependingly carried by the upper one of said cross-beams between said end plates and in spaced relation with respect to each other, said teeth being connected to the upper one of said cross-beams for a swinging movement transversely with respect to said pair of cross-beams between a forwardly position and a rearwardly position, said teeth projecting by their lower ends below the lower one of said cross-beams, a plurality of channel members secured to the lower side of the lower one of said cross-beams, and spring means in said channel members connected to said teeth adjacent their lower ends for biasing said teeth toward the forwardly position.

References Cited in the file of this patent

UNITED STATES PATENTS

| | | |
|---|---|---|
| 2,081,192 | Allin et al. | May 25, 1937 |
| 2,510,445 | Way | June 6, 1950 |

FOREIGN PATENTS

| | | |
|---|---|---|
| 894,182 | France | Mar. 6, 1944 |